Patented Apr. 29, 1952

2,594,291

UNITED STATES PATENT OFFICE 2,594,291

PROCESS FOR THE PRODUCTION OF HIGH PURITY TANNING EXTRACTS

Theone C. Cordon, Erdenheim, Pa., and Lynferd J. Wickerham, Peoria, Ill., assignors to the United States of America as represented by the Secretary of Agriculture No Drawing. Application January 13, 1950, Serial No. 138,522

10 Claims. (Cl. 195—7)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of tannins and more particularly to the preparation of high purity tanning extracts from canaigre (*Rumex hymenosepalus*).

An object of the invention is to provide a process for improving the purity of tanning extracts from liquors obtained by extraction of canaigre roots. Another object is the provision of a method for reducing the non-tannin constituents of such liquors by fermentation. Other objects and advantages of the invention will be apparent from the following description.

Liquors obtained on extraction of canaigre roots, either with water or by using aqueous organic solvents as the extractants with subsequent removal of the organic solvent from the extract, contain in addition to tannins large amounts of soluble solids, containing a large proportion of sugars, the presence of which lowers considerably the purity of the resulting tanning extracts.

Heretofore attempts to produce high purity tanning extracts from canaigre liquors by methods involving the conversion of the non-tannin constituents to fermentation products have not been completely successful. Growth factors required by some micro-organisms appear to be inactivated by the tannin containing substrate. Conventional methods for promoting the growth of micro-organisms by altering the composition of the fermentation medium are not adapted for use in conjunction with canaigre liquor. Thus, addition of nutrient salts is undesirable because they would contaminate the extract; proteinaceous adjuncts are immediately precipitated by the tannin, and the pH of the liquor cannot be changed, except slightly, from the normal 4.0–5.5, because this would adversely affect the tannin. Therefore, most of the suitable micro-organisms, that is those which do not destroy tannin, fail to grow in canaigre liquor, while others grow poorly producing a slow and incomplete fermentation resulting in the decomposition of only a portion of the sugars.

We have found that the non-tannin content of canaigre liquor can be substantially reduced by fermentation without materially affecting the tannins present therein, by subjecting the liquor to the fermentative action of yeast grown on a hydrolyzate of spent canaigre roots.

According to the method of this invention a hydrolyzate of spent canaigre roots is prepared from the extraction residue obtained on extracting tannins from canaigre roots with water or with aqueous organic solvents using any suitable extraction procedure such as those described by Cordon, Beebe and Rogers, J. Am. Leather Chem. Assoc. 41, 161; 42, 118; Rogers and Luvisi, ibid. 43, 167; Luvisi, Cordon, Beebe and Rogers, ibid. The extraction residue is refluxed with a dilute aqueous solution of a strong mineral acid, that is an acid having a dissociation constant greater than $1\times10^{-2}$, such as sulfuric or hydrochloric acid, followed by neutralization and filtration of the mixture so obtained. The hydrolysis may also be accomplished by amylases such as those from malt or molds. The resulting hydrolyzates are capable of supporting good growth of a number of different species or strains of yeast without addition of any nutrients. After allowing the yeast to grow on sterile hydrolyzate the yeast cells, recovered by centrifugation or any suitable means, are transferred to canaigre liquor for a length of time sufficient to bring the fermentation process to completion. The fermentation process may be operated using a re-cycling procedure whereby the yeast cells are harvested from the hydrolyzate placed in canaigre liquor until the sugars have been utilized, after which the cells are again harvested and placed in a fresh lot of hydrolyzate and the process repeated indefinitely.

Analyses of the fermented material show that the purity of the thus treated liquor increases from about 50 to about 72 (the purity being 100 times the tannin content divided by the soluble extractives) and about 95 percent of the total sugars are consumed. Alcohol yields of about 85% of the theoretical are obtained and there is no loss of tannin. About 85% of the sugar in the hydrolyzate is consumed and about 90% of the theoretical amount of alcohol is recovered. The alcohol may be recovered from both the fermented hydrolyzates and the fermented liquors by any conventional procedure.

The process of our invention is applicable to any canaigre extract liquor produced by the aforementioned extraction methods, and any of the spent canaigre resulting therefrom may be used in the production of the hydrolyzate.

Any yeast may be used, those which ferment or assimilate sucrose and maltose being especially well adapted for use in the process. The best results, however, are obtained with strains of *Saccharomyces cerevisiae, Hansenula anomala* and *Torulopsis utilis* (Stelling-Dekker, N. M., Die sporogenen Hefen. Natuurkunde. (Tweede Sectie) Deel 28, 1–547 (1931). Lodder, J., Die anaskosporogenen Hefen. Erste Halfte. Natuurkunde. (Tweede Sectie) Deel 32, 1–256 (1934). The use of these strains is therefore preferred.

The process is, in one aspect, characterized as for recovering tannins from canaigre by extracting canaigre roots with an aqueous extractant to produce a tannin-containing canaigre water-extract liquor and an extraction residue consisting of spent canaigre root material, comprising: contacting the spent root material with an aqueous solution of a strong mineral acid at a temperature and for a length of time sufficient to cause hydrolysis of the starch present in said material; separating and neutralizing the resultant liquid hydrolyzate; inoculating the hydrolyzate with a yeast and allowing the fermentation to proceed until the major portion of the sugar content of hydrolyzate has been consumed; separating the yeast cells from the fermented hydrolyzate and transferring them to the canaigre extract liquor; allowing the fermentation of the liquor to proceed substantially to completion and thereafter separating the yeast cells and recovering the alcohol from the fermented extract liquor.

The following example is given as an illustrative embodiment of one way in which our invention is carried out in practice:

One hundred eighty grams of spent canaigre roots were refluxed for three hours with 3000 ml. of 2.0% sulfuric acid solution. After filtration the filtrate was neutralized with 56 g. of calcium carbonate. The calcium sulfate was filtered off and the cake washed once with water. The combined filtrate and washings amounted to 3,120 ml. containing 3.0% sugar as glucose.

Three hundred ml. of this hydrolyzate was inoculated with *Torulopsis utilis* (NRRL–Y–660) and incubated 24 hours at 30° C. on a shaker. After centrifuging at 2000 R. P. M. for 20 minutes the supernatant liquid was poured off and the cells transferred to 300 ml. of canaigre extract liquor. Following incubation for 6 hours at 30° C., on a shaker, the liquor was centrifuged and the cells placed in a fresh lot of hydrolyzate. The same procedure was followed as above except that the liquor was incubated for 16 hours. The results so obtained are shown in the following table.

|  | Incubation Time hours | Purity of Liquor | | Alcohol Yield Per cent theoretical | Sugar Consumed Per cent theoretical |
| --- | --- | --- | --- | --- | --- |
|  |  | Unfermented | Fermented |  |  |
| 1st hydrolyzate | 24 |  |  | 78.4 | 83.0 |
| 1st liquor | 6 | 50.3 | 62.9 | 90.6 | 55.9 |
| 2d hydrolyzate | 24 |  |  | 79.8 | 84.5 |
| 2d liquor | 16 | 50.3 | 72.9 | 84.1 | 96.8 |

Similar results were obtained by analogous procedures using other yeast cultures such as NRRL; Y–821, Y–862, Y–813 and Y–791 of *Saccharomyces cerevisiae*, Y–359 of *Hansenula anomala* and Y–793 of *Torulopsis utilis*.

Since the bulk of the easily hydrolyzable carbohydrates in spent canaigre roots is starch, any of the usual methods of starch hydrolysis may be utilized for the production of the hydrolyzate used in our process. Thus sulfuric acid, hydrochloric acid, or any other strong mineral acid may be employed in aqueous solutions of adequate concentration at a temperature and for a length of time sufficient to cause hydrolysis of the major portion of the starch present in the spent canaigre roots. We have found that boiling under reflux with 2% aqueous sulfuric or hydrochloric acid for 3 hours, using sufficient acid to cover the root, usually gives sugar yields of about 90% of the theoretical, based on the starch content of the spent root material. The rate and extent of hydrolysis may be increased by increasing the acid concentration, time and, or the temperature. Some representative results are shown in the following table. The starch content of the spent canaigre was about 56%.

| Boiling Time, hours | Sulfuric Acid Solution as Per cent by Weight—Glucose [1] as per cent of original spent | | | |
| --- | --- | --- | --- | --- |
|  | 1% | 2% | 3% | 4% |
| ½ | 9.1 | 18.6 | 35.5 | 47.3 |
| 1 | 16.1 | 31.4 | 49.6 | 56.8 |
| 1½ | 24.2 | 40.1 | 56.8 | 58.7 |
| 2 | 28.3 | 47.3 | 57.8 | 61.2 |
| 3½ | 42.6 | 56.8 | 59.7 | 62.6 |
| 5 | 51.2 | 61.4 | 62.8 | 66.3 |

[1] Calculated as starch.

The hydrolysis can also be effected by a continuous countercurrent process. In one such experiment 62.7% of the original spent was recovered as glucose (calculated as starch). The glucose content of the hydrolyzate was about 10%.

The hydrolyzates and liquors may be fermented anaerobically with a somewhat more efficient conversion of sugar to alcohol. However, this procedure increases the time necessary for the fermentation to reach completion. The liquors and hydrolyzates may also be aerated during fermentation but lower alcohol yields result.

Having thus described our invention, we claim:

1. In a process for recovering tannins from canaigre by extracting canaigre roots with an aqueous extractant to produce a tannin-containing canaigre water-extract liquor and an extraction residue consisting of spent canaigre root material, the steps comprising: contacting the spent root material with an aqueous solution of a strong mineral acid at a temperature and for a length of time sufficient to cause hydrolysis of the starch present in said material; separating and neutralizing the resultant liquid hydrolyzate; inoculating the hydrolyzate with a yeast and allowing the fermentation to proceed until the major portion of the sugar content of the hydrolyzate has been consumed; separating the yeast cells from the fermented hydrolyzate and transferring them to the canaigre extract liquor; allowing the fermentation of the liquor to proceed substantially to completion and thereafter separating the yeast cells and recovering the alcohol from the fermented extract liquor.

2. The process as defined in claim 1 wherein the yeast is a strain of *Saccharomyces cerevisiae*.

3. The process as defined in claim 1 wherein the yeast is a strain of *Hansenula anomala*.

4. The process as defined in claim 1 wherein the yeast is a strain of *Torulopsis utilis*.

5. The process as defined in claim 1 wherein the aqueous solution of a strong mineral acid is a 2% solution of sulfuric acid and the hydrolysis is effected at reflux temperature.

6. In a process for recovering tannins from canaigre by extracting canaigre roots with an aqueous extractant to produce a tannin-containing water-extract liquor and an extraction residue consisting of spent canaigre root material, the steps comprising: hydrolyzing the starch in said root material, to produce a liquid hydrolyzate; inoculating the hydrolyzate with a yeast and allowing the fermentation to proceed until the major portion of the sugar content of the hydrolyzate has been consumed; separating the yeast cells from the fermented hydrolyzate and transferring them to the canaigre extract liquor; allowing the fermentation of the liquor to proceed substantially to completion and thereafter separating the yeast cells and recovering the alcohol from the fermented extract liquor.

7. The process of fermenting sugars in tannin-containing canaigre extract liquor which comprises allowing a yeast to grow, prior to being introduced into said liquor, in a medium comprising neutralized acid hydrolyzate of canaigre roots freed of the major proportion of their tannin constituent by extraction with an aqueous solvent, and thereafter introducing said yeast into the tannin-containing canaigre extract liquor and allowing the fermentation to proceed.

8. The process of reducing the non-tannin content of tannin-containing water extracts of canaigre roots which comprises subjecting the extract to the fermentative action of yeast grown in a medium comprising sugar containing hydrolyzate of canaigre roots which roots had been extracted with aqueous solvent to reduce the tannin content prior to making the hydrolyzate.

9. The process of claim 8 in which the yeast is taken from the group consisting of *Saccharomyces cerevisiae*, *Hansenula anomala* and *Torulopsis utilis*.

10. The process of claim 1 in which the yeast strain is taken from the group consisting of *Saccharomyces cerevisiae*, *Hansenula anomala*, and *Torulopsis utilis*.

THEONE C. CORDON.
LYNFERD J. WICKERHAM.

REFERENCES CITED

The following references are of record in the file of this patent:

UNITED STATES PATENTS

| Number | Name | Date |
| --- | --- | --- |
| 757,352 | Sanguineti | Apr. 12, 1904 |
| 1,528,469 | Davidson | Mar. 3, 1925 |
| 2,281,392 | Smead | Apr. 28, 1942 |
| 2,284,500 | Warth | May 26, 1942 |

FOREIGN PATENTS

| Number | Country | Date |
| --- | --- | --- |
| 23,392 | Great Britain | of 1902 |

OTHER REFERENCES

Chemical Abstracts 42:7075b, Luvisi et al., Jour. Am. Leather Chemists Assoc. 43, 166–181 (1948).